Oct. 1, 1935.   H. P. BASSETT   2,016,222

CATALYTIC PRODUCTION OF SULPHUR TRIOXIDE

Filed March 1, 1932

Catalyst of $Fe_2O_3$ prepared by the low temperature decomposition of an iron oxygen bearing salt.

Inventor
Harry P. Bassett
by his Attorneys
Howson & Howson

Patented Oct. 1, 1935

2,016,222

UNITED STATES PATENT OFFICE 2,016,222

CATALYTIC PRODUCTION OF SULPHUR TRIOXIDE

Harry P. Bassett, Philadelphia, Pa.

Application March 1, 1932, Serial No. 596,129

3 Claims. (Cl. 23—174)

My invention relates to the catalytic production of sulphur trioxide and to the catalyst and more particularly it relates to a process for the conversion of sulphur dioxide from any of a number of sources to sulphur trioxide, in which process a novel and highly efficient catalyst is employed. The invention further relates to a method of utilizing waste pickling liquors and to the production of sulphur trioxide therefrom.

One object of my invention is to provide an efficient and expedient process for the production of sulphur trioxide in which there is employed an active and relatively cheap catalyst which is not subject to poisoning by the contaminants accompanying the sulphur dioxide to the catalytic chamber.

A further object of my invention is to furnish a process for the catalytic production of sulphur trioxide in which the removal of the dust from the sulphur trioxide gas presents no problem since the catalyst is practically insoluble in the concentrated sulphuric acid of the absorption system and any that may be carried into the acid may be easily removed therefrom by simple filtration or decantation without appreciable contamination of the acid.

Still another object of my invention is to provide a process for the catalytic production of sulphur trioxide in which the catalyst may be recirculated through the catalytic chamber and where substantially complete conversion of the sulphur dioxide into the sulphur trioxide is obtained without accurate temperature control.

Still another object of the invention is to furnish a process for the manufacture of sulphur trioxide from sulphites or sulphates, particularly from ferrous sulphate which may be obtained from waste pickling solutions, thus affording a process for the utilization of these commercial wastes.

Other objects including the production of a novel catalyst will be apparent from a consideration of the specification and claims.

Figure 1:
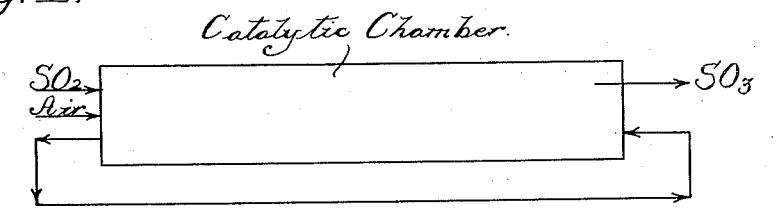
Figure 1 illustrates diagrammatically the production of sulphur trioxide from sulphur dioxide by means of the novel catalyst.

My invention contemplates the use of ferric oxide ($Fe_2O_3$) as the catalyst in the conversion of sulphur dioxide to sulphur trioxide, which catalyst is obtained by the low temperature decomposition of an iron compound, for example an iron hydroxide or an iron oxygen-bearing salt. Any one of the ferrous or ferric oxygen-bearing salts which is capable upon low temperature decomposition of forming ferric oxide may be employed, for example the sulphate, sulphite, nitrate, carbonate or acetate. For the purposes of this invention, it is to be understood that ferrous and ferric hydroxide are to be included in the phrase "iron oxygen-bearing salt". In the preparation of the catalyst, the iron oxygen-bearing salt is heated at a temperature not exceeding 700° C. and preferably at a temperature in the neighborhood of 600° C., although the exact temperature to be employed will depend somewhat upon the temperature of decomposition of the particular salt being heated. For example, in the case of ferrous sulphate whose decomposition point is 586° C., a temperature slightly above this, in the neighborhood of 600° C., is sufficient. The heating may take place in the presence of or in the absence of air. The salt is heated for a sufficient time to bring about the decomposition and since the time of heating is dependent upon the temperature employed and upon the mass of material to be decomposed, no definite figures can be given although I have found that in general heating for twenty minutes is all that is required. Hereinafter, throughout the specification and claims, the catalyst will be termed "ferric oxide obtained by the low temperature decomposition of an iron oxygen-bearing salt".

This catalyst, which may be employed in the finely divided condition in which it is originally obtained or may be suitably agglomerated, is efficient in operation and is not subject to poisoning by the contaminants accompanying the sulphur dioxide. It may be successfully employed in the manufacture of sulphur trioxide from sulphur dioxide obtained from any source, for example from waste metallurgical gases, by burning sulphur, by roasting pyrites, or by heating a sulphate or a sulphite. The use of the catalyst, due to its cheapness and insolubility in the concentrated sulphuric acid of the absorption system, presents no problem in dust removal as has heretofore been encountered since any of the catalyst that is carried by the stream of sulphur trioxide into the acid absorption system may be easily removed therefrom by filtration or decantation without appreciable contamination of the acid. The catalyst is particularly adapted for continuous recirculation through the catalytic chamber and fresh supplies of catalyst may be added as desired. The continuous recirculation of the catalyst allows the process to be carried out without accurate temperature control, for if the catalyst at the end of the chamber at which the sulphur dioxide enters is at a temperature above that for correct conversion the temperature of the catalyst at some point in the chamber will be at the correct conversion temperature.

The manufacture of sulphur trioxide from sulphur dioxide gas is illustrated diagrammatically in Figure 1 where sulphur dioxide and an excess of air are passed into the catalytic chamber which may be of any suitable construction, for example, an internally or externally heated rotary furnace. While a chamber may be employed in which there is no recirculation of the catalyst, I prefer to pass continuously the catalyst through the chamber since in this instance less accurate temperature control is required. The passage of the catalyst may either be with the flow of gases or countercurrent thereto, as shown in the diagram. In either event, the catalyst at the end of the furnace at which the gases enter should be maintained at a temperature above 425° C–450° C. (the conversion temperature), for example at 550° C. The heat maintained in the remainder of the furnace is immaterial so long as the temperature at the end of the furnace at which the gases leave the chamber is below that of the conversion temperature. It will thus be seen that necessarily at some point in the chamber the catalyst is at the correct temperature for complete conversion of the sulphur dioxide into sulphur trioxide. The catalyst may be removed from the catalytic chamber and carried by a conveyor if desired to the opposite end of the chamber and again fed thereto. The sulphur trioxide gases leaving the furnace may be passed through a dust remover and then absorbed as is customary in 60° to 66° Baumé sulphuric acid.

Figure 2:
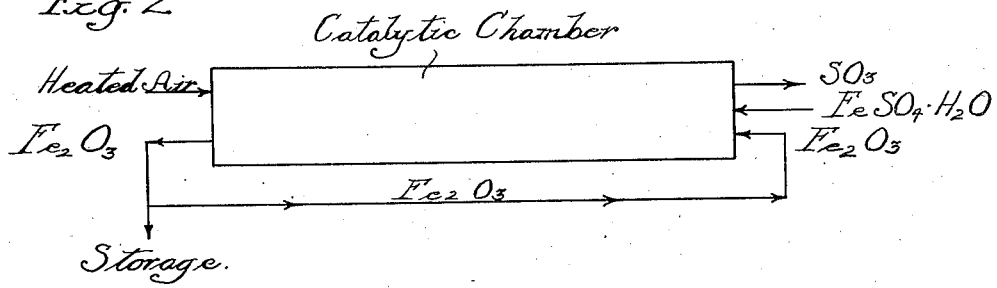
Figure 2 shows diagrammatically the production of sulphur trioxide from sulphur dioxide obtained by the decomposition of a sulphate, specifically ferrous sulphate.

As previously pointed out, the sulphur dioxide may be obtained by heating a sulphate or sulphite. In Figure 2, there is shown diagrammatically a process in which an iron sulphate (ferrous sulphate monohydrate) is subjected to heat in a catalytic chamber in the presence of the catalyst of the present invention. While any other sulphate or sulphite may be treated in the same manner, the treatment of an iron sulphate has certain advantages since the supply of catalyst is automatically replenished by its decomposition. In the diagram (Figure 2) excess heated air enters the catalytic chamber at one end and ferrous sulphate monohydrate crystals and the catalyst are passed into the chamber at the opposite end in contact with each other, and are continuously passed therethrough. It is at this end of the chamber that the sulphur trioxide is removed. The catalytic chamber is maintained at a temperature at least in one portion thereof above the decomposition point of ferrous sulphate, that is to say, above 586 degrees C. Since the ferrous sulphate begins to decompose at 186 degrees C., a temperature approximating this may be maintained at the end of the chamber at which it enters, and the temperature increased to 586 degrees C., or above, as the materials continue through the chamber. Preferably, a temperature in the neighborhood of 600 degrees C. is maintained at a point near the end of the chamber at which the air enters and the catalyst leaves and in no case is the temperature in the chamber in excess of 700 degrees C. The temperature at the end of the chamber at which the sulphur trioxide leaves and the ferrous sulphate and catalyst enter is immaterial so long as it is below the temperature of conversion of 425 degrees C.–450 degrees C., thus assuring a correct temperature for conversion at some portion of the chamber. The ferrous sulphate as it is heated decomposes to form ferric oxide ($Fe_2O_3$), sulphur dioxide, and sulphur trioxide. The sulphur dioxide in the presence of excess air and in the presence of the catalyst is converted into sulphur trioxide which, together with the sulphur trioxide obtained by the decomposition of the ferrous sulphate, may be freed from dust and absorbed in concentrated sulphuric acid in the usual manner. The ferric oxide which results from the decomposition mingles with the ferric oxide catalyst and since it is formed by the low temperature decomposition of an iron oxygen-bearing salt, it functions as a catalyst and may be employed as such in subsequent runs. This process also is particularly adapted for continuous recirculation of the catalyst, for example, in an externally or internally heated rotary furnace, since as before the furnace in this instance will be at the correct conversion temperature at one portion thereof without accurate temperature control. Since the amount of catalyst is being continuously replenished in this process, a portion thereof is re-fed to the chamber while the remaining portion is stored for use in subsequent or other runs or for the market as paint oxide or otherwise. The proportion of catalyst to ferrous sulphate may vary widely. As a typical example, I have found that 50% of the catalyst to 50% of ferrous sulphate is satisfactory.

The ferrous sulphate to be treated as shown in Figure 2 may advantageously be obtained from the waste solutions resulting from the treatment of iron or steel by dilute sulphuric acid to remove the oxide film and rust therefrom. The disposal of these so-called pickling solutions at the present time presents an industrial problem since great difficulty is encountered therein due in part to legislation which prevents the pollution of streams. The volume of waste pickling solutions in the country is quite tremendous, and I propose to use these solutions as a source of ferrous sulphate for the production of sulphur trioxide.

Figure 3:
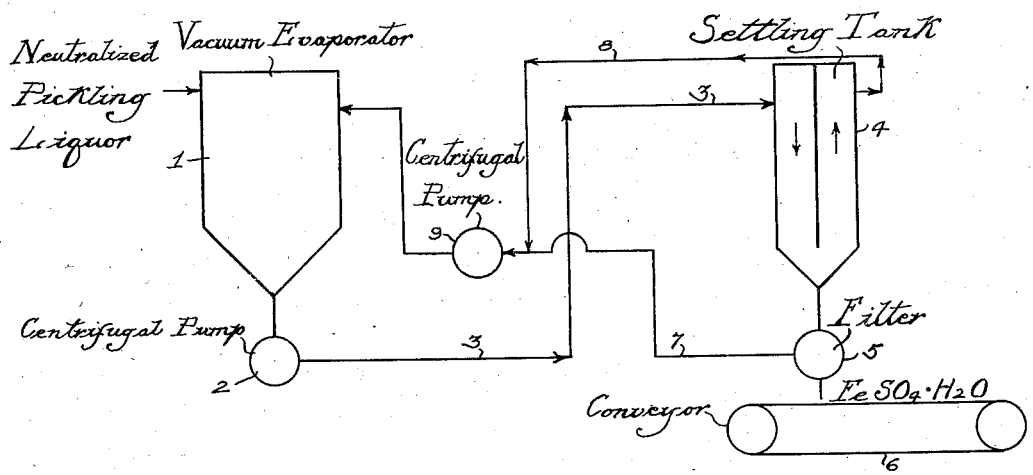
Figure 3 illustrates diagrammatically one method of obtaining ferrous sulphate from waste pickling liquors.

While the ferrous sulphate may be obtained from the pickling solutions in any suitable manner, for example, by evaporation of the solution, and while the heptahydrate and trihydrate are applicable as well as the monohydrate for use in the production of sulphur trioxide, I prefer to obtain the ferrous sulphate monohydrate by the method shown diagrammatically in Figure 3. The waste pickling solution is neutralized preferably by the addition of scrap iron in amounts sufficient to counteract the acidity. The neutralized pickling solution is then passed to an evaporator, shown in Figure 3 as a vacuum evaporator at 1, and is continuously concentrated. When it becomes sufficiently concentrated, it deposits monohydrate from solution. The concentrated solution is circulated by means of a centrifugal pump 2 through pipe line 3 to settling tank 4. The clear liquor is allowed to flow back to the evaporator through pipe line 8 either by vacuum or by means of a pump 9 (as shown in the drawing). The ferrous sulphate monohydrate is separated from the mother liquor by filter 5, and the filtrate is returned to the evaporator through pipe 7 by means of a pump 9. The separated monohydrate is passed by a conveyor 6, or otherwise, to storage to be used in the preparation of sulphur trioxide, as stated above. It will be seen that the above process for obtaining the ferrous sulphate monohydrate is simple to carry out and a compound is obtained from the waste pickling solutions which is applicable for the production of sulphur trioxide.

Considerable modification is possible in the steps involved in the catalytic production of the sulphur trioxide from the sulphur dioxide, either furnished to the catalytic chamber as a gas or obtained by the decomposition of a sulphate or sulphite, as well as in the method of utilizing the waste pickling solutions without departing from the essential features of my invention.

I claim:

1. The process of obtaining sulphur trioxide from an iron oxygen-bearing salt forming sulphur dioxide and ferric oxide upon heating, as the source of sulphur dioxide, which comprises intimately mixing said salt and a catalyst of ferric oxide obtained by the decomposition of an iron oxygen-bearing salt at a temperature not exceeding about 700° C., passing said mixture of salt and catalyst continuously through a catalytic chamber, admitting air to the chamber at the end opposite that at which the catalyst and said salt enter and the sulphur trioxide is removed, maintaining the portion of the catalytic chamber near the air entrance at a temperature above the salt decomposition temperature and the portion of the catalytic chamber near the sulphur trioxide exit at a temperature below the dissociation temperature of sulphur trioxide, the temperature in the chamber not exceeding approximately 700° C. and removing the sulphur trioxide gas from one end of said chamber and the ferric oxide from the opposite end thereof.

2. The process of obtaining sulphur trioxide from an iron oxygen-bearing salt forming sulphur dioxide and ferric oxide upon heating, as the source of sulphur dioxide, which comprises intimately mixing said salt and a catalyst of ferric oxide obtained by the decomposition of an iron oxygen-bearing salt at a temperature not exceeding about 700° C., passing said mixture of salt and catalyst continuously through a catalytic chamber, admitting air to the chamber at the end opposite that at which the catalyst and said salt enter and the sulphur trioxide is removed, maintaining the portion of the catalytic chamber near the air entrance at a temperature above the salt decomposition temperature but less than 700° C. and the portion of the catalytic chamber near the sulphur trioxide exit at a temperature below the dissociation temperature of sulphur trioxide, the temperature in the chamber not exceeding approximately 700° C. and removing the sulphur trioxide gas from one end of said chamber and the ferric oxide from the opposite end thereof.

3. The process of obtaining sulphur trioxide from an iron oxygen-bearing salt forming sulphur dioxide and ferric oxide upon heating, as the source of sulphur dioxide, which comprises intimately mixing said salt and a catalyst of ferric oxide obtained from a previous run of said process, passing said mixture of salt and catalyst continuously through a catalytic chamber, admitting air to the chamber at the end opposite that at which the catalyst and said salt enter and the sulphur trioxide is removed, maintaining the portion of the catalytic chamber near the air entrance at a temperature above the salt decomposition temperature but less than 700° C. and the portion of the catalytic chamber near the sulphur trioxide exit at a temperature below the dissociation temperature of sulphur trioxide, the temperature in the chamber not exceeding approximately 700° C., removing the sulphur trioxide gas from one end of said chamber and the ferric oxide from the opposite end thereof, and re-using at least a portion of said ferric oxide as a catalyst in said process in admixture with further amounts of iron oxygen-bearing salt.

HARRY P. BASSETT.